Jan. 9, 1934.   M. E. HENNING   1,942,697
SURFACE SWITCH
Filed Oct. 9, 1930   2 Sheets-Sheet 1

Inventor
Malcolm E. Henning
by Bair, Freeman & Sinclair
Attorneys

Witness
H. S. Wunzenmain

Jan. 9, 1934.  M. E. HENNING  1,942,697
SURFACE SWITCH
Filed Oct. 9, 1930  2 Sheets-Sheet 2
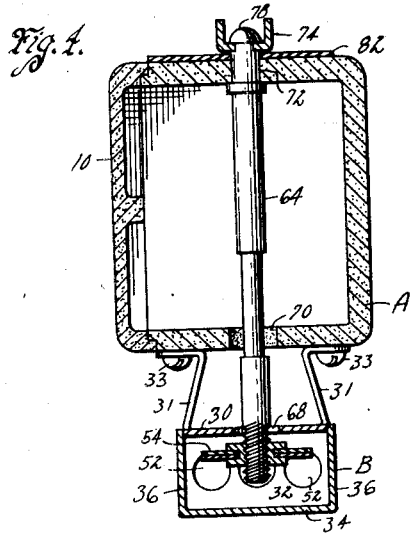
Fig.4.
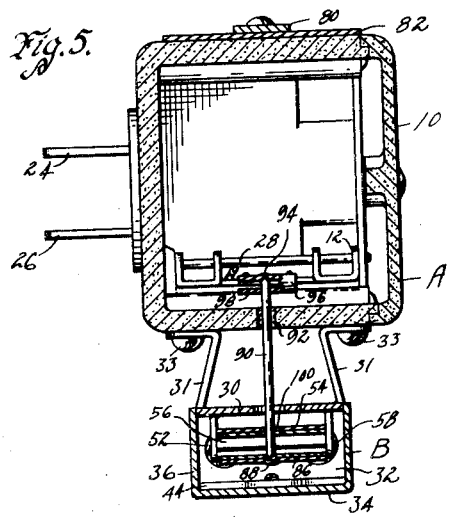
Fig.5.
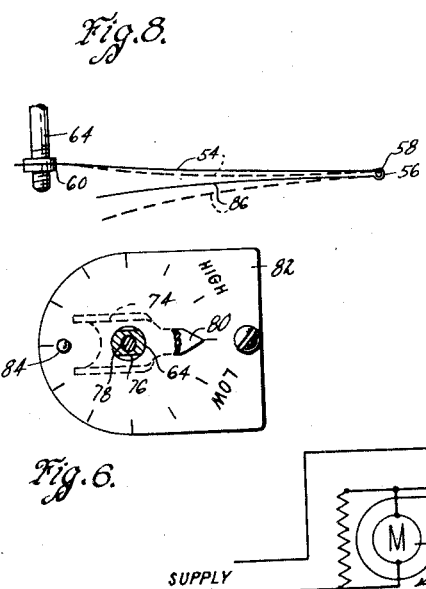
Fig.8.
Fig.6.
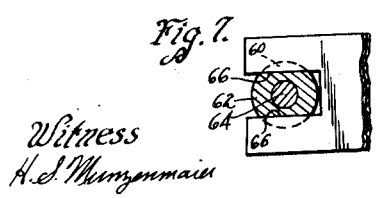
Fig.7.
Witness
H. S. Munzenmaier
Inventor
Malcolm E. Henning
by Bair, Freeman & Sinclair
Attorneys Patented Jan. 9, 1934

1,942,697

UNITED STATES PATENT OFFICE 1,942,697

SURFACE SWITCH

Malcolm E. Henning, Des Moines, Iowa, assignor to Penn Electric Switch Co., Des Moines, Iowa, a corporation of Iowa Application October 9, 1930. Serial No. 487,494

6 Claims. (Cl. 200—139)

An object of my invention is to provide a simply constructed surface switch which automatically controls the closing and opening of a switch, depending on temperature radiated from a surface to which the device is attached.

A further object is to provide a surface switch having a heat responsive element of novel construction whereby the movement of the element as occasioned by different degrees of heat is multiplied for thus producing sufficient movement for actuation of the switch.

More particularly, it is my object to provide a surface switch comprising a switch casing and a surface casing connected together, the surface casing being adapted for attachment to a surface of a hot water or hot air pipe or the like and having therein a heat responsive element, the switch casing having a switch structure therein, the heat responsive element and the switch structure being operatively connected together whereby the switch is controlled to move to open and closed circuit positions, depending on the degree of heat radiated from the surface to which the device is attached.

Another object is to provide a bimetallic heat responsive element of folded construction having one end adjustably mounted and the fold thereof pivotally mounted, the other end of the element being connected through a thrust pin connection with a switch arm and magnetic means being provided for constraining the switch arm toward one of its positions.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 4 is a sectional view on the line 4—4 of Figure 2 illustrating an adjustment for the device.

Figure 5 is a sectional view on the line 5—5 of Figure 2 illustrating the operative connection between the heat responsive element and the switch structure.

Figure 6 is a sectional view on the line 6—6 of Figure 2 showing the adjustment scale and pointer associated therewith.

Figure 7 is a sectional view on the line 7—7 of Figure 2 illustrating a connection between the adjustment means and the heat responsive element.

Figure 8 is a diagrammatic view of the heat responsive element illustrating its action when in use and Figure 9 is an electrical diagrammatic view showing the surface switch connected in circuit with an oil burner motor.

Figure 1:
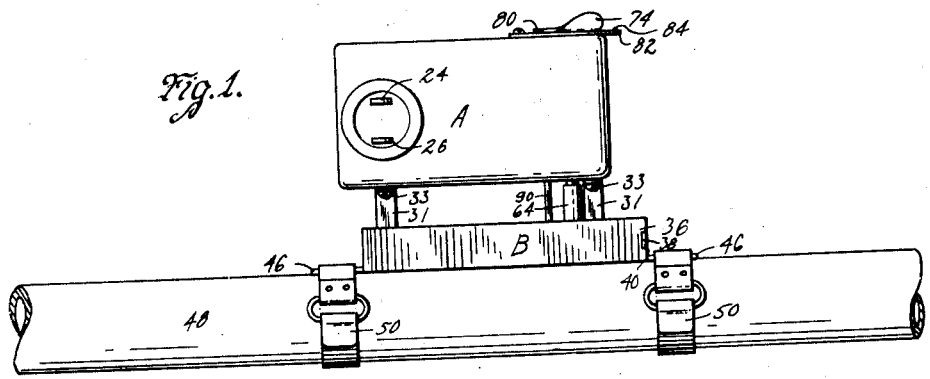
Figure 1 is a back elevation of a surface switch embodying my invention and showing it connected with a pipe.

On the accompanying drawings I have used the reference character A to indicate generally a switch casing and B a surface casing. The switch casing A is provided with a removable cover 10 and houses a switch consisting of a pivoted switch arm 12 and associated parts. The associated parts include a contact 14 carried by the switch arm 12 and slightly movable relative thereto, such movement being controlled by a leaf spring 16. The contact 14 may be termed a movable contact and is adapted for coaction with a stationary contact 18 when the switch is in closed circuit position.

Figure 2:
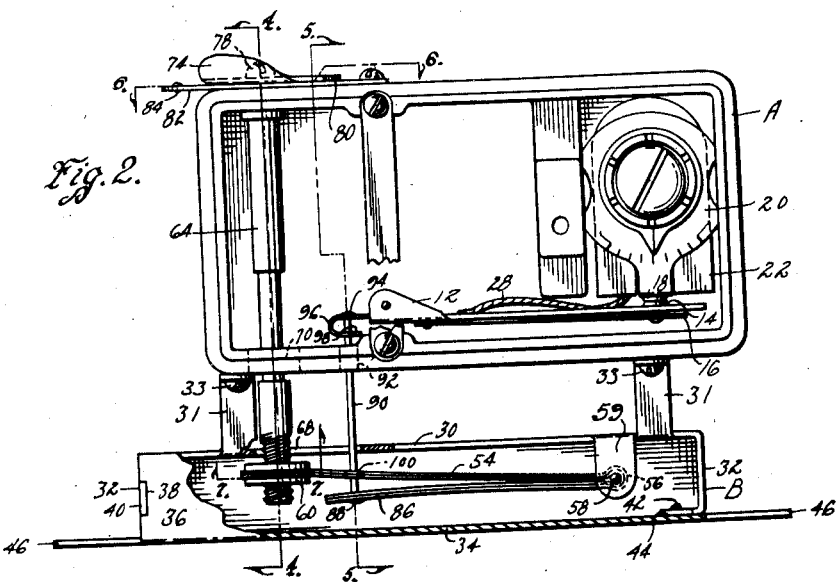
Figure 2 is a front elevation of the same on an enlarged scale showing the switch casing cover removed and a portion of the surface casing cover broken away.
Figure 3:
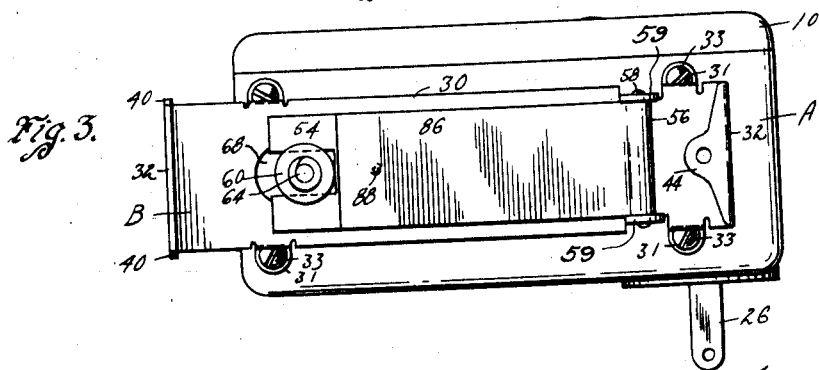
Figure 3 is a bottom plan view of Figure 2 showing the surface switch with the cover of the surface casing removed.

The contact 18 is carried by a contact plate 20 which serves also to retain a magnet 22 in position with respect to the switch casing A. An adjusting means for moving the contact 18 is illustrated in Figure 2, but forms no part of my present invention. It is fully described in my co-pending application, Serial No. 423,677, filed January 27, 1930. The magnet 22 constrains the switch arm 12 toward movement in a closed circuit direction. The contact plate 20 is electrically connected with a contact prong 24, while the switch arm 12 is electrically connected with a contact prong 26 by means of a flexible lead 28. The switch structure may be connected in a control circuit by means of a two socket plug adapted to coact with the prongs 24 and 26 in the ordinary manner.

The surface casing B comprises a top member 30 and two end members 32 to which is connected a bottom member 34 having side members 36.

Legs 31 are formed on the member 30 and by means of screws 33 they are secured to the switch casing A for thereby mounting it in spaced relationship to the surface casing B.

The side members 36 are notched as indicated at 38 to fit over lugs 40 formed on one of the end members 32 and a single countersunk screw 42 threaded into a lug 44 of the other end member 32 serves to hold the two parts of the surface casing B together.

The bottom member 34 is provided with end extensions 46. The member 34 and the extensions 46 are adapted to lie against the surface of a pipe or the like 48 and may be secured thereto by sheet metal bands 50 or the like. The pipe 48 may be a conductor for hot water, steam, hot air or the like and the pipe will be heated from such liquid or air flowing through it. The surface casing B will be similarly heated, it being made preferably of copper, aluminum, or the like so as to conduct the heat readily and quickly from the surface of the pipe 48 to the interior of the casing B. Ventilating openings 52 may be formed in the end members 32 to prevent confining of the heat within the casing B and thus render the heat responsive element therein more accurate in its movements with respect to the degree of heat radiated from the pipe 48.

The heating element just referred to is designated by the reference numeral 54 and comprises a bimetallic strip of metal which is folded transversely intermediate its ends as indicated at 56. The fold 56 is pivoted on a pin 58 supported by ears 59 extending down from the top member 30 of the surface casing B.

One end of the heat responsive element 54, as indicated at 60, is adjustably mounted by means of a nut 62 and a threaded control rod 64. The nut 62 has parallel bottom grooves 66 cut in two sides thereof for the end 60 of the heat responsive element 54 to slidably coact with. The end 60 is forked for this purpose as best shown in Figure 7 of the drawings.

The control rod 64 extends through an opening 68 in the top member 30 of the surface casing B, then through an opening 70 in the switch casing A and its upper end is journalled in an opening 72 of the switch casing A. A control wing 74 is secured to a non-circular portion 76 of the control rod 64 by means of a screw 78. The control wing 74 has a pointer 80 with which is associated a graduated dial 82. A stop 84 is engaged by the pointer 80 to prevent more than one revolution thereof. The threads on the lower end of the rod 64 are preferably coarse whereby to get the desired adjusting movement with but one rotation of the control rod 64.

The remaining end of the heat responsive element 54, which is indicated at 86, is provided with a slight depression 88 coacting with the lower end of a thrust rod 90. The thrust rod 90 extends upwardly through the opening 68 in the surface casing B, then through an opening 92 in the switch casing A and contacts with a depression 94 formed in an arm 96.

The arm 96 is secured to the switch arm and has a perforated end 98 acting as a guide for the thrust pin 90. The arm 60 of the heat responsive element 54 is provided with an opening 100 which also acts as a guide for the thrust pin 90.

Practical operation

In Figure 9 I have illustrated an installation with a water boiler 102 and an oil burner motor 104. My surface switch is secured to the hot water pipe 106 of the boiler and is connected in series with the motor 104 and a room thermostat 108. When the water is cool in the pipe 106 the contacts 14 and 18 will be closed and when the room thermostat 108 calls for heat its contacts will also be closed whereby the oil burner will commence to operate. When the water in the pipe 106 reaches a predetermined temperature it will open the contacts 14 and 18 in the surface switch to prevent overheating of the water and consequently overheating of a room, which would be occasioned by the circuit being opened by the room thermostat after a radiator in the room has become fully hot to warm the entire atmosphere and thus actuate the room thermostat to open circuit position. If it were not for the switch structure A the room would continue to heat and thus become overheated so that it is desirable to prevent this by generating "shots" of heat. Thus the switch structure A may be operated intermittently while the thermostat 108 calls for heat and the circuit will be opened by the room thermostat regardless of the switch A when the room has become hot enough and will remain in such position until the room thermostat again closes.

One of the main advantages of a surface switch is that it can be directly mounted on a surface of a pipe or the like without the necessity of having to tap into a boiler or provide other means of obtaining heat control for a control switch. This eliminates draining the boiler when tapping it for the type of thermostat which is inserted. By providing a heat responsive element of the character herein disclosed, an effective means is provided for operating the switch from heat radiated from a surface.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a switch structure of the class described, a switch housing and a switch casing connected together in spaced relation to each other, switch mechanism within said switch housing, a temperature responsive element within said switch casing, an operative connection having its ends extending into said switch housing and said switch casing and connecting said switch mechanism and said temperature responsive element together and means for adjusting said temperature responsive element comprising a control rod having a knob thereon external of said switch housing, said rod extending through said switch housing from front to back thereof, through the front and into said switch casing and connected therein with said temperature responsive element.

2. In a surface switch, a switch casing, a switch structure therein, a surface casing, a heat responsive element therein and pivoted intermediate its ends, an operative connection between said switch structure and one end of said heat responsive element and means extending from said switch casing for adjusting said element for changing the range of operation of said surface switch, said adjusting means comprising a rotatable threaded control rod and a nut coacting therewith, said nut being non-rotatably associated with the other end of said heat responsive element.

3. In a switch structure, a switch casing, a switch arm therein, magnetic means constraining said arm toward movement in one direction, a heat responsive element, a thrust pin engagement connection between said element and said switch arm for moving the switch arm against the action of the magnetic means when the heating element assumes a predetermined position, said magnetic means operating to maintain said thrust pin in engagement with said element and with said switch arm, said element and said switch arm having each a perforated guide part through which said thrust pin is slidable.

4. In a surface switch, a switch casing, a switch arm therein, magnetic means constraining said arm toward movement in one direction, a heat responsive element adapted to be actuated from heat radiated from a surface of an object and a thrust pin connection between said element and said switch arm for moving the switch arm against the action of the magnetic means when the heating element assumes a predetermined position, said heat responsive element being of folded construction and means for anchoring one end and the fold thereof, the other end coacting with said thrust pin.

5. In a surface switch, a switch casing, a switch arm therein, magnetic means constraining said arm toward movement in one direction, a heat responsive element adapted to be actuated from heat radiated from a surface of an object and a thrust pin connection from said element and said switch arm for moving the switch arm against the action of the magnetic means when the heating element assumes a predetermined position, said heat responsive element being of folded construction, means for adjustably anchoring one end thereof, means for anchoring the fold thereof, and the other end thereof coacting with said thrust pin.

6. In a switch structure, a switch member and means for automatically operating the same comprising a folded heat responsive element, means for anchoring one end and pivotally supporting the fold thereof, and means for operatively connecting the other end of said element with said switch member, the anchored end of said element having an opening therethrough and the last mentioned means extending from the other end of said element through said opening to said switch member.

MALCOLM E. HENNING.